United States Patent Office 3,501,545
Patented Mar. 17, 1970

3,501,545
PROCESS FOR RECOVERING THE AROMATIC VALUE OF SULFUR-CONTAINING STILL BOTTOMS FORMED DURING THE REFINING OF STYRENE
Joseph Peter Henry, South Charleston, W. Va., assignor to Union Carbide Corporation, New York, N.Y., a corporation of New York
No Drawing. Filed Dec. 27, 1968, Ser. No. 787,553
Int. Cl. C07c *15/10;* C10c *1/08;* C10g *23/02*
U.S. Cl. 260—674                          12 Claims

ABSTRACT OF THE DISCLOSURE

Sulfur-containing tars, produced during the refining of styrene, are hydrotreated to recover their aromatic value as well as their sulfur value. These tars are diluted with benzene, filtered, and the resulting filtrate hydrotreated to convert the tars to readily recoverable products.

---

This invention relates to the hydrotreating of sulfur-containing tars and is particularly related to the hydrotreating of those tars which have been formed during refining of crude styrene produced by the dehydrogenation of ethylbenzene. In one of its more specific aspects, the present invention is directed to the hydrotreatment of such tars in order to recover both their aromatic value as well as their sulfur value for further use.

A major source of commercial supply of styrene monomer is the dehydrogenation of ethylbenzene. This process, which has achieved widespread and worldwide attention in recent years, generally involves the dehydrogenation of ethylbenzene to styrene in one or more reactors containing conventional dehydrogenation catalysts. Steam is either premixed with the hydrocarbon feed or is introduced along the reactor. It serves both as a diluent and as a source of heat for the endothermic dehydrogenation reaction.

The conversion to styrene generally ranges from about 40 to about 70 percent by weight depending on the number of the reactors, the manner of steam distribution and utilization as well as such other reaction conditions as temperature, pressure and residence time in the reactor. In all cases however, the reactor effluent comprises styrene, steam, unconverted ethylbenzene as well as some other aromatic hydrocarbons in minor amounts. The reactor effluent is ordinarily subjected to a series of distillations culminating in a styrene refining operation. Elemental sulfur is usually added to the crude styrene feed to the distillation section in order to inhibit the polymerization of styrene.

The final distillation step in the refining operation is conducted in a distillation column of the usual variety in which high purity styrene (at least 99 percent purity) is recovered as the distillate. The bottoms product from this column contains some styrene, some elemental sulfur, sulfur-containing polymeric materials and a minor quantity of polymeric compounds which do not contain any sulfur. The bottoms product from the styrene refining column has variously been referred to as styrene tars, sulfur-containing tars or styrene refining still bottoms.

Although these sulfur-containing tars contain unused elemental sulfur, they are not usually recycled to the refining section for reuse as an inhibitor due to the presence of the sulfur-containing polymeric materials. These polymeric materials have been found to actually promote rather than inhibit the polymerization of styrene. Accordingly, it is a common industrial practice to burn or otherwise dispose of these tars.

More stringent pollution control laws in recent years present a serious problem with respect to the disposal of these sulfur-containing tars. Their burning results in the liberation of sulfur dioxide which is an objectionable pollutant in the air. Furthermore, the disposal of these tars results in an irretrievable loss of both the sulfur value as well as the aromatic value which might otherwise be recovered for further use in the process. No suitable method is now known which could obviate the problems inherent in the disposal of such tars, nor has there yet been a procedure for the efficient and economical recovery of sulfur and aromatic values of such sulfur-containing tars.

Therefore, this invention contemplates the provision of a process for the recovery of both sulfur and aromatic values of sulfur-containing tars while at the same time obviating the pollution difficulties which have heretofore been associated with their disposal.

A specific object of this invention is the recovery of the aromatic and sulfur values of these styrene tars for reuse and the provision of a process for accomplishing this objective without the usual concomitant pollution problems.

It has now been discovered that the sulfur and aromatic values of sulfur-containing tars can be recovered and the foregoing pollution problem obviated by the simultaneous hydrodesulfurization and hydrodealkylation of such sulfur-containing tars. Such simultaneous hydrodesulfurization and hydrodealkylation will hereinafter be referred to as "hydrotreating."

In its broadcast aspect, the process of this invention comprises diluting the sulfur-containing tars with benzene or some other suitable solvent, filtering the diluted tar to remove solid sulfur, and passing the resulting filtrate together with hydrogen through a hydrotreating reaction zone containing a suitable hydrotreating catalyst under hydrotreating conditions. Essentially all the sulfur-containing tars are thus converted to lower-boiling (B.P. less than 250° C.) readily-recoverable aromatic compounds, the major components of which are benzene, ethylbenzene, diethylbenzene and toluene. Essentially all the sulfur is recovered as hydrogen sulfide. Ethylbenzene may be recycled to the dehydrogenation reactor, and benzene, toluene and diethylbenzene may be recycled to an appropriate point in the process scheme. Sulfur may be recovered from the hydrogen sulfide by known techniques and recycled to the styrene refining section, as previously discussed, in order to act as an inhibitor and thus prevent the polymerization of styrene during the distillation step.

Although benzene has been mentioned as the diluent, other diluents such as toluene, xylenes and other aromatic hydrocarbons may be employed, if desired. It should be pointed out, however, that the product distribution to a large extent depends upon the diluent which is employed. For example, if benzene is used, the resulting products will contain considerable amounts of ethylbenzene whereas if toluene is employed in the diluent, considerable amount of methylethylbenzene will be produced. The production of ethylbenzene is particularly desirable since it can be recycled to the dehydrogenation reaction zone.

The weight ratio of diluent-to-tar can generally vary from about 0.1:1 to about 10:1, preferably from about 1:1 to 5:1. It is advisable, however, to use sufficient quantity of diluent as otherwise serious operational difficulties may be encountered due to the highly viscous nature of these tars.

The hydrotreating conditions, i.e., the temperature, pressure, liquidhourly space velocity (LHSV) of the diluted sulfur-containing tar, and the hydrogen-to-hydrocarbon ratio in the feed to the hydrotreating reaction zone can generally vary over a relatively wide range. Thus, the hydrotreating temperature is generally between about 250° C. and 600° C., preferably between about 350° C. and 500° C.

The pressure under which the hydrotreating reaction is carried out is not narrowly critical in this invention. It is advantageous, however, to maintain the hydrotreating zone at superatmospheric pressure; preferably at a pressure between about 200 to about 2000 p.s.i.g.

The LHSV of the diluted tar feed to the hydrotreating zone and the hydrogen-to-dilute tar ratio in this zone must be carefully controlled so as to insure complete and efficient hydrotreating of the sulfur-containing tar and their substantially quantitative desulfurization and conversion to lower boiling aromatic hydrocarbons having boiling points below about 250° C. in order to facilitate their distillation and recovery. Thus the LHSV of the diluted tar can vary from about 0.1 to about 10, preferably from about 1 to about 5 and the hydrogen-to-diluted tar mole ratio is generally from about 2:1 to about 20:1.

The catalysts employed in the process of this invention are uniquely suitable for the hydrotreating of sulfur-containing tars. These catalysts are capable of promoting the hydrodesulfurization of such tars while simultaneously promoting their hydrodealkylation to the desired aromatic compounds.

Basically, the catalysts which are uniquely suitable in the process of this invention consist of a hydrogenation component and an active acidic component generally used as a support for the hydrogenation component. Several of the heretofore known hydrodesulfurization catalysts have been investigated as the hydrogenation component. These included chromium oxide ($Cr_2O_3$), tungsten oxide ($WO_3$), vanadium pentoxide ($V_2O_5$), stannous and stannic sulfides (SnS and $SnS_2$), titanium dioxide ($TiO_2$), ferric oxide ($Fe_2O_3$), metallic iron, ferrous sulfide (FeS) and vanadium trisulfide ($V_2S_3$). While these catalysts have been effective in promoting the hydrodesulfurization of such tars, not all have been found to be suitable for their simultaneous hydrodesulfurization and hydrodealkylation. Only chromium oxide, tungsten oxide and vanadium pentoxide have been found to be suitable for this purpose and therefore these oxides, or any mixture thereof, constitute the hydrogenation component of the catalyst used in the present hydrotreating reaction.

The active, acidic component of the catalyst generally constitutes a support for the hydrogenation component. Exemplary active, acidic materials include silica-alumina, metal-exchanged and/or decationized molecular sieves, acid treated bentonite type clays, acid treated kaolin-type clays, alumina-boria, magnesia-silica, boron phosphate or any mixture of such materials.

The hydrogenation component is either impregnated into the active, acidic material or is otherwise adsorbed thereon by any of the conventional methods. The amount of the hydrogenation component in the catalyst must be sufficient to promote complete saturation of the double bonds formed from the hydrodealkylation reaction and to insure completion of the hydrodesulfurization of the sulfur-containing tars. This amount can vary from about 5 to about 40 weight percent, preferably from about 10 to about 25 weight percent based on the weight of the finished catalyst.

The hydrotreating reaction of this invention can be carried out continuously, semi-continuously or in batchwise manner. In continuous operation, the hydrocarbon feed (diluted sulfur-containing tars) and hydrogen are separably introduced to the top of the reaction zone containing a fixed bed of the aforesaid catalyst and the products continuously withdrawn and subjected to a product recovery section to recover hydrogen sulfide and the various simple aromatic compounds which have been formed during the reaction.

The desired level of catalytic activity can be maintained by periodic regeneration of the catalyst. This may be effected by conventional regeneration procedure such as burning with air, etc.

The present invention will now be illustrated by the following example.

EXAMPLE

The feed in this example was 2.2 pounds of a styrene-still refining bottoms having the composition indicated in the table below.

The apparatus employed basically consisted of a reactor, a liquid-vapor separator, pressure traps, atmospheric traps and their associated instruments. The reactor was a one-inch schedule 80 stainless steel pipe, 36 inches long. It contained a catalyst section and two sections of Filtros packing above and below the catalyst section.

The catalyst was chromium oxide impregnated on silica-alumina, with the chromium oxide constituting 16 percent by weight of the catalyst. This was prepared by impregnating dried silica-alumina with an aqueous solution of $CrO_3$ which was reduced to $Cr_2O_3$ with hydrogen.

The feed was first diluted with half its weight of benzene and the resulting mixture was filtered to recover essentially all the free sulfur therefrom. The filtrate was diluted with benzene to obtain a diluted mixture containing 46 weight percent benzene and the resulting solution was then pumped to the top of the reactor at an LHSV of 2. Hydrogen was separately introduced to the reactor at a rate of 9.0 cubic feet per hour.

The reactor was maintained at 450° C. and 400 p.s.i.g. The reactor effluent was introduced into the liquid-vapor separator where most of the organic material was condensed. The uncondensed vapors were withdrawn and condensed in the pressure traps and finally in the cold traps (at −78° C).

The liquid products from the liquid-vapor separator and the various traps were combined and distilled into various fractions in a Vigraux column. These fractions were analyzed for their sulfur content as well as by vapor-phase chromatography to determine the product distributions. Approximately 98 weight percent material balance was achieved in this example. The compositions of the feed in this example and the products are shown in the following table.

TABLE

| Components | Diluent-free, wt. percent | |
|---|---|---|
| | Feed | Product |
| Benzene | 0.0 | 28.3 |
| Toluene | 0.0 | 6.1 |
| Styrene | 20.3 | 0.0 |
| Ethylbenzene | 0.0 | 32.3 |
| Unknown 1 [1] | 4.1 | 7.5 |
| Unknown 2 [1] | 4.9 | 7.9 |
| Unknown 3 [1] | 0.4 | 3.5 |
| Unknown 4 [1] | 25.6 | 13.8 |
| Heavies [2] | 44.7 | 0.6 |
| | 100.0 | 100.0 |

[1] There were materials whose chemical composition was not determined but which were resolvable by vapor-phase chromatography.
[2] Consisted of high molecular weight materials and polymers.

It is noted from the foregoing table that the heavies are essentially eliminated and substantial amounts of ethylbenzene and benzene have been produced. Furthermore, the sulfur content of the feed was drastically reduced from 10.62 weight percent (on a diluent-free basis) to 0.06 weight percent. In addition the benzene and ethylbenzene fractions recovered by distillation of the products contained less than 5 parts per million of sulfur.

What is claimed is:

1. A process for recovering the aromatic value of sulfur-containing still bottoms formed during the refining of crude styrene produced by the dehydrogenation of ethylbenzene comprising the following steps:
 (a) diluting the still bottoms with from about 0.1 to about 10 times the weight of said still bottoms of a diluent selected from the group consisting of benzene, toluene, xylene, and mixtures thereof;
 (b) filtering the mixture of still bottoms and diluent to remove solid sulfur;
 (c) passing the filtrate and hydrogen through a hydrotreating reaction zone wherein the temperature is from about 250° C. to about 600° C. and the liquid hourly space velocity is from about 0.1 to about 10, said reaction zone containing a catalyst comprising a hydrogenation component selected from the group consisting of chromium oxide, tungsten oxide, vanadium oxide, and mixtures thereof and an active, acidic component selected from the group consisting of silica-alumina, metal-exchanged and decationized molecular sieves, acid-treated bentonite-type clays, acid-treated kaolinite-type clays, alumina-boria, magnesia-silica, boron phosphate, and mixtures thereof; and (d) withdrdawing the effluent from the reaction zone and separating same.

2. The process of claim 1 wherein said diluent is benzene.

3. The process of claim 2 wherein the benzene-to-tar weight ratio is from about 1:1 to about 5:1.

4. The process of claim 1 wherein said hydrogenation component is chromium oxide and said active, acidic component is silica-alumina.

5. The process of claim 2 wherein said hydrogenation component is chromium oxide and said active, acidic component is silica-alumina.

6. The process of claim 3 wherein said hydrogenation component is chromium oxide and said active, active, acidic component is silica-alumina.

7. The process of claim 1 wherein said temperature is from about 350° C. to about 500° C. and the liquid hourly space velocity is from about 1 to about 5.

8. The process of claim 2 wherein said temperature is from about 350° C. to about 500° C. and the liquid hourly space velocity is from abbout 1 to about 5.

9. The process of claim 3 wherein said temperature is from about 350° C. to about 500° C. and the liquid hourly space velocity is from about 1 to about 5.

10. The process of claim 7 wherein said hydrogenation component is chromium oxide and said active, acidic component is silica-alumina.

11. The process of claim 8 wherein said hydrogenation component is chromium oxide and said active, acid component is silica-alumina.

12. The process of claim 9 wherein said hydrogenation component is chromium oxide and said active, acid component is silica-alumina.

References Cited

UNITED STATES PATENTS

| | | | |
|---|---|---|---|
| 2,913,397 | 11/1959 | Murray et al. | 260—672 |
| 3,268,608 | 8/1966 | De Rosset | 260—668 |
| 3,293,308 | 12/1966 | Vol-Epstein | 260—621 |
| 3,344,201 | 8/1967 | Schuman | 260—669 |
| 3,367,861 | 2/1968 | Aldridge et al. | 208—211 |
| 3,395,095 | 7/1968 | Child et al. | 208—111 |
| 3,398,063 | 8/1968 | Van Tassel | 203—91 |
| 3,408,263 | 10/1968 | Ward | 260—669 X |
| 3,408,264 | 10/1968 | Ward | 203—2 |
| 3,408,265 | 10/1968 | Ward | 260—669 X |
| 3,426,091 | 2/1969 | Miron et al. | 260—669 |
| 3,168,583 | 2/1965 | Kovach | 260—672 |
| 3,193,594 | 6/1965 | Emmerson | 260—672 |

DELBERT E. GANTZ, Primary Examiner

G. E. SCHMITKONS, Assistant Examiner

U.S. Cl. X.R.

208—88, 211; 260—668, 672